United States Patent
Krumme et al.

(10) Patent No.: US 7,379,503 B2
(45) Date of Patent: May 27, 2008

(54) DEVICE FOR RECEIVING DIGITAL SIGNALS

(75) Inventors: Nils Krumme, Feldafing (DE); Harry Schilling, Eichstätt (DE); Georg Lohr, Eichenau (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 810 days.

(21) Appl. No.: 10/654,266

(22) Filed: Sep. 3, 2003

(65) Prior Publication Data
US 2004/0102162 A1 May 27, 2004

(30) Foreign Application Priority Data
Sep. 5, 2002 (DE) ................. 102 41 583

(51) Int. Cl.
*H04L 25/00* (2006.01)
*H04B 5/00* (2006.01)

(52) U.S. Cl. ................... 375/257; 455/41.1
(58) Field of Classification Search ........... 375/344, 375/256, 285, 257, 258; 342/28, 383; 370/338, 370/312, 278; 455/562.1, 67.11, 41.1; 340/870.3; 398/76; 329/311; 714/39
See application file for complete search history.

(56) References Cited

U.S. PATENT DOCUMENTS

| | | | | |
|---|---|---|---|---|
| 5,140,696 A | * | 8/1992 | Fox | 455/41.1 |
| 5,157,393 A | * | 10/1992 | Fox et al. | 340/870.3 |
| 5,577,026 A | * | 11/1996 | Gordon et al. | 370/278 |
| 5,721,756 A | * | 2/1998 | Liebetreu et al. | 375/344 |
| 5,818,389 A | * | 10/1998 | Lazar | 342/383 |
| 6,104,935 A | * | 8/2000 | Smith et al. | 455/562.1 |
| 6,433,631 B2 | * | 8/2002 | Pearson et al. | 329/311 |
| 6,650,276 B2 | * | 11/2003 | Lawless | 342/28 |
| 6,993,291 B2 | * | 1/2006 | Parssinen et al. | 455/67.11 |
| 7,076,168 B1 | * | 7/2006 | Shattil | 398/76 |
| 7,106,715 B1 | * | 9/2006 | Kelton et al. | 370/338 |
| 2002/0116667 A1 | * | 8/2002 | McEwen et al. | 714/39 |
| 2006/0176839 A1 | * | 8/2006 | Frazer et al. | 370/312 |

FOREIGN PATENT DOCUMENTS

| | | |
|---|---|---|
| DE | 4405817 | 8/1994 |
| DE | 4412958 | 10/2005 |

OTHER PUBLICATIONS http://en.wikipedia.org/wiki/Near_and_far_field ; Near and Far Field; pp. 1-3, Feb. 12, 2007.*

* cited by examiner

*Primary Examiner*—Don N. Vo
(74) *Attorney, Agent, or Firm*—Kevin L. Daffer; Daffer McDaniel, LLP

(57) ABSTRACT

A device for receiving digital signals comprising at least one receiving antenna, a measuring means for determining parameters of relevance to signal quality, a digitizer, and a signal-processing unit. The signal-processing unit is controlled to optimize the reception of the digital signals on the basis of the parameters determined by the measuring means. A signal-processing unit processes signals from the receiving antenna and a digitizer converts the processed signals so that the converted processed signals can be measured to determine their relevance signal quality; a transmitter conductor array coupled to the receiving unit can be controlled therefrom. Controlling the signal quality occurs using a dielectric or ferromagnetic materials, impedance elements, or actuators between the receiving antenna and the transmitter conductor array.

18 Claims, 1 Drawing Sheet

DEVICE FOR RECEIVING DIGITAL SIGNALS

FIELD OF THE INVENTION

The present invention relates to a device for receiving digital signals between a plurality of units relative to each other.

For the sake of clarity, in the present document, the transmission between units mobile relative to each other, on the one hand, is not distinguished from the transmission between a stationary unit and units mobile relative to the first unit, on the other hand, because this is only a question of local relationship and does not take any influence on the mode of operation of the invention. Equally, a distinction is not made between the transmission of signals and energy because the mechanisms of operation are the same in this respect.

PRIOR ART

In units mobile along a linear path, such as crane and conveyor installations, and also rotary units such as radar systems and also computer tomographs, it is necessary to transmit electrical signals or energy, respectively, between units mobile relative to each other. To this end, mostly a conductor array is provided in the first unit and corresponding tapping means are provided in the second unit. The term "conductor arrays" as used in the description given below refers to any forms whatsoever of conductor arrays conceivable, which are suitable for conducting electrical signals. This refers also to the known contacting sliding paths or slip rings, respectively.

A suitable device is described in the laid-open German Patent Application DE 44 12 958 A1. There, the signal to be transmitted is supplied into a strip conductor of the first unit that is arranged along the path of the movement of the units mobile relative to each other. The signal is tapped from the second unit by means of capacitive or inductive coupling. The coupling factor of the signal between the two units is substantially a function of the distance of the two units relative to each other. Particularly in transmission systems with three-dimensional extension and particularly in the event of high speeds of movement, the distances between the mobile units cannot be determined with an optional precision, in view of the mechanical tolerances. As a result, as the position of the two units relative to each other, the speed (e.g. caused by vibrations) and other influential parameters vary, the coupling factor frequently varies, too. At the same time, the signal amplitude at the receiver input varies as well. This results in variations in the signal in receivers presenting the conventional structure, which are noticeable, for instance, in the form of an increased jittering or even bit errors.

The U.S. Pat. No. 6,433,631 B2 discloses a device for feedback control of the input level at the receiver. To this end, the signal amplitude is detected downstream of a pre-amplifier and an attenuator provided ahead of the pre-amplifier is controlled in correspondence with this signal amplitude. The disadvantage of this arrangement resides in the aspect that a signal of constant amplitude can be made available exclusively to the receiver. For the transmission or for analyzing signals, respectively, the signal amplitude is a parameter that should be maintained within defined limits of the dynamic range of the receiver but that does not have any further relevance in other respects. What is essential for the assessment of the signal quality are other signal-relevant parameters, for instance the signal-to-noise ratio, the bit error ratio, the eye pattern or even the spectral composition of the signal. These parameters are not considered in the analysis so that further transmission errors cannot be precluded.

BRIEF DESCRIPTION OF THE INVENTION

The present invention is based on the problem of designing a device for the transmission of electrical signals, which avoids the aforedescribed disadvantages and displays, in particular, a high quality of the signals in transmission.

In accordance with the present invention, the problem is solved with the means defined in the independent Patent Claim. Expedient improvements of the invention are the subject matters of the dependent further Claims.

An inventive device for the transmission of digital signals comprises a receiving antenna (1) for receiving signals in the near field of a transmitter conductor array. Such a transmitter conductor array may be a conventional slip ring, for instance, or a line for the transmission of high-frequency signals, which is terminated in a reflection-free manner. What is essential is the aspect that this transmitter conductor array is suitable for conducting electrical signals and that reception of signals is possible in the near field of this transmitter conductor array. Accordingly, a receiving antenna (1) is mounted in the vicinity of the transmitter conductor array for receiving the signals in the near field of the latter. A direct galvanic contact between the receiving antenna (1) and the transmitter conductor array remains equally without influence on the realization of the invention. Such a configuration of the contact is encompassed by the subject matter of the invention as well, without mentioning this fact explicitly in the following. A galvanic contact can be created not only by metal contacts but also by means of carbon brushes sliding on sliding paths.

Moreover, a signal processing unit (2) is provided for processing the signals supplied by the receiving antenna. The electrical parameters of this signal processing unit can be adjusted by means of external signals. The signals processed by this signal processing unit are passed on to a digitizer (3) for conversion of the received signal into digital signals (6). The signal received from the receiving antenna (1) presents analog characteristics because it is possible that it is superimposed by varying amplitudes, distorted shapes of characteristic graphs and interference as well as noise. A digitizer may be configured, for instance, as comparator or as an amplifier with limiting properties (limiting amplifier). Such a digitizer is occasionally also referred to as demodulator. What is essential for the invention is the aspect that this digitizer converts the analog input signal with a varying amplitude into a digital output signal of predetermined level magnitudes.

Moreover, a measuring means (7) is provided for determining at least one parameter relevant for the signal quality. Such parameters are, for instance, the signal amplitude, the noise, the bit error ratio or the spectral composition of the signal. When, for example, the signal is also dependent on the relative position between the transmitter and the receiver of the data transmission path this position is a signal-relevant parameter, too, and is hence optionally considered in the detection, too. For the detection of these additional parameters, optional further sensors such as angle detectors, position detectors, temperature sensors as well as sensors detecting further environmental parameters are encompassed, which take an influence on the signal.

Moreover, according to the present invention, the measuring means (7) is connected to the signal-processing unit in such a way that the detected parameters are communicated to this unit. Furthermore, the signal-processing unit is so configured that it ensures the processing of the signals supplied by the receiving antenna in correspondence with the communicated parameters. The signal-processing unit is hence capable of responding to varying signal characteristics such as varying noise levels, varying bit error ratios or other changes in the characteristics of the input signal and of carrying out the necessary corrections.

Owing to an inventive device, a substantially better quality in signal transmission can be achieved, compared against prior art.

In a particularly expedient embodiment of the invention, the signal-processing unit (2) comprises filters that can be controlled in terms of their frequency response. It is thus possible to correct frequency-dependent distortions along the signal transmission path. It is likewise possible with these provisions to filter out certain narrow-band interference.

In a further expedient embodiment of the invention, the signal-processing unit (2) comprises a controllable transmission function. Such a controllable transmission function enables, for instance, a correction of signal amplitudes that are too great or too small, as well as the clipping of high interference peaks.

According to another embodiment of the invention, the signal-processing unit (2) comprises means for clock regeneration. Such means include, for example, a PLL element (phase-locked loop) for synchronization with the clock pulse of a data stream. It is now possible, in a manner known per se, to regenerate the clock pulse of the transmitted signal and to reduce hence jittering in the signal.

Another embodiment of the invention provides for the configuration of the measuring means (7) for the detection and for signaling electrical parameters of the HF input signal, like the amplitude, the signal-to-noise ratio or even the spectral composition.

In a further configuration of the invention, the measuring means (7) is designed for detecting and signaling additional physical parameters such as the distance between the transmitter and the receiver, the speed between the transmitter and the receiver or even a temperature value. When, for instance, the amplitude of the transmitted signal is influenced by the transmitter temperature this value could also be considered as an additional parameter. The same applies, of course, also to the receiver temperature or the temperature of other components and modules taking an influence on the signal transmission.

A further embodiment of the invention envisages the provision of at least one further signal path including a transmitter, a conductor array and an additional receiving antenna with an analyzer linked up therewith. The signal transmitted via this further signal path and analyzed by the additional analyzer means serves as reference signal for the analysis of the data signal. An analysis may be carried out, for instance, by a comparison of the two signals or at least characteristic properties of the signals such as the amplitude, the signal-to-noise ratio, etc. Equally, a reference signal could be received also via the first receiving antenna (1).

Another inventive device comprises at least a controller for controlling the coupling between a receiving antenna (1) and a transmitter conductor array. Moreover, a measuring means (7) is provided for detecting at least one among the parameters relevant for the signal quality, with this measuring means being connected to the controller for controlling the coupling in such a way that it communicates to this unit the detected parameters relevant for the signal quality. Furthermore, the controller for controlling the coupling is so configured that it adjusts the coupling between the receiving antenna (1) and the transmitter conductor array in correspondence with the parameters signaled by the measuring means. It is possible, for instance, to design the provisions for the adjustment of coupling with a variation of the geometric arrangement, by an additional design with predetermined impedances or by the insertion of materials taking an influence on coupling.

In a particularly expedient embodiment of the invention, additional dielectric or ferro-magnetic elements are provided that are incorporated into the space between the transmitter conductor array and the receiving antenna in correspondence with the control signals. For example, dielectric materials may be included to increase the coupling effect. This can be achieved, for instance, by means of a wedge-shaped or helical arrangement so as to ensure the continuous control of the coupling function.

According to another expedient embodiment of the invention, additional impedances are connected to the receiving antenna for setting the coupling to desired values. With an appropriate dimensioning it is also possible to adjust a frequency-dependence of the coupling function. When the receiving antenna is subjected to a stronger load with low-resistance impedances it is possible to reduce the coupling effect whilst it is increased by a reduction of the load.

A further embodiment of the invention envisages the provision of additional control elements or actuators for adapting the position of the receiving antenna relative to the transmitter conductor array in correspondence with the detected parameters. In this manner it is possible, for instance, to reduce the distance for increasing the coupling effect and to widen the distance for a reduction of the coupling effect. In the event of non-symmetrical coupling in the transmission of symmetrical signals, it is likewise possible, for example, to correct the symmetry by tilting the receiving antenna relative to the transmitter conductor array.

DESCRIPTION OF THE DRAWINGS

In the following, the present invention will be described by exemplary embodiments, without any limitation of the general inventive idea, with reference to the drawings.

FIG. 1 illustrates an example of an inventive device. A receiving antenna (1) in a generalized form is provided for tapping electrical or electromagnetic signals from the near field of a transmitting conductor array. Here, the HF input signal (4) received by the receiving antenna (1) is supplied to a signal-processing unit (2). The output signal (5) of the signal-processing unit is supplied to a measuring means (7) for measuring the parameters relevant for signal transmission and to a digitizer (3) for conversion into digital signals. Moreover, a feedback control loop is provided in such a manner that the signal from the measuring means (7) is supplied as feedback control signal (8) for control of the signal-processing unit (2) to the latter. The measuring means determines defined parameters descriptive of the HF input signal such as optionally the signal amplitude, the noise power, the noise level, the signal-to-noise ratio, the eye opening in terms of height or width, respectively, as well as optionally a summary parameter composed of these parameters. The HF input signal is then processed in correspondence with this control signal.

FIG. 2 shows another inventive device in a generalized form. The HF input signal (4) tapped by a receiving antenna (1) is supplied to a measuring means (7) for determining the parameters relevant for the signal as well as to a signal-processing unit (2) for processing the signal. The output signal (5) of the signal-processing unit is, in its turn, supplied to a digitizer (3) for conversion of the analog signals into digital signals. The measuring means determines defined parameters relevant for the signal, as is described above, and signals these parameters as control signal (10) for signal processing in the signal-processing unit. The latter unit sets its parameters in a corresponding manner so that a signal (5) with largely constant characteristics is communicated to the digitizer.

Figure 1:
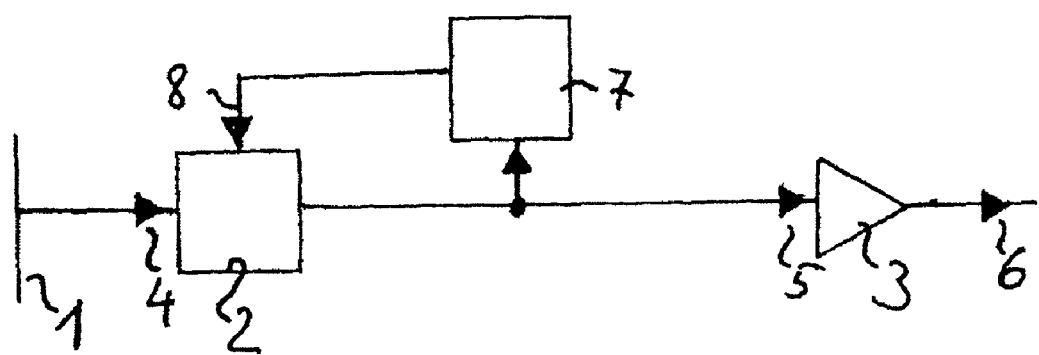
FIG. 1 shows a schematic illustration of an inventive device in a general form.
Figure 2:
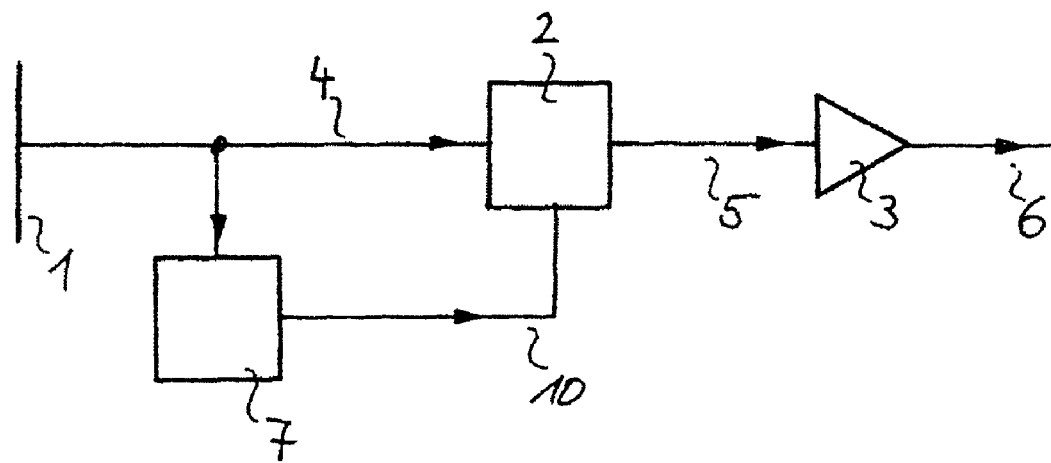
FIG. 2 illustrates a modified inventive device.

List of reference numerals
1 receiving antenna
2 signal-processing unit
3 digitizer
4 HF input signal
5 amplitude-controlled signal
6 digital output signal
7 measuring means
8 feedback control
10 control signal

The invention claimed is:

1. A device for receiving digital signals, comprising:
   a receiving antenna for receiving signals in a near field of a transmitter conductor array, said signals having analog properties;
   a signal-processing unit for processing signals supplied by the receiving antenna;
   a digitizer for converting processed signals supplied by the signal processing unit to digital signals;
   wherein at least one controller is provided for controlling a coupling between said receiving antenna and said transmitter conductor array;
   wherein a measuring means is provided for determining at least one parameter of relevance to signal quality and is connected to communicate to said at least one controller the determined at least one parameter of relevance to signal quality; and
   wherein said at least one controller controls the coupling between said receiving antenna and said transmitter conductor array according to the determined at least one parameter communicated by said measuring means; and
   wherein dielectric or ferromagnetic materials are provided for insertion by means of suitable actuators into a space between said receiving antenna and said transmitter conductor array according to the determined at least one parameter communicated by said measuring means.

2. The device of claim 1 wherein said signal-processing unit comprises filters having a controllable frequency response.

3. The device of claim 1 wherein said signal-processing unit has a controllable transmission function.

4. The device of claim 1 wherein said signal-processing unit comprises means for timing recovery.

5. The device of claim 1 wherein said measuring means is adapted to measure electrical parameters of an HF input signal, including at least one of the amplitude, a signal-to-noise ratio, and a spectral composition, and to communicate said electrical parameters to said signal processing unit.

6. The device of claim 1 wherein said measuring means is adapted to measure physical parameters, including at least one of a distance between a transmitter and a receiver, a speed between the transmitter and the receiver, or also a temperature value, and to communicate said physical parameters to said signal processing unit.

7. A device for receiving digital signals, comprising:
   a receiving antenna for receiving signals in a near field of a transmitter conductor array, said signals having analog properties;
   a signal-processing unit for processing signals supplied by the receiving antenna;
   a digitizer for converting processed signals supplied by the signal processing unit to digital signals;
   wherein at least one controller is provided for controlling a coupling between said receiving antenna and said transmitter conductor array;
   wherein a measuring means is provided for determining at least one parameter of relevance to signal quality and is connected to communicate to said at least one controller the determined at least one parameter of relevance to signal quality; and
   wherein said at least one controller controls the coupling between said receiving antenna and said transmitter conductor array according to the determined at least one parameter communicated by said measuring means; and
   wherein impedance elements, comprising dielectric or ferromagnetic materials, are connected to said receiving antenna for matching said receiving antenna to said transmitter conductor array.

8. The device of claim 7, wherein said signal-processing unit comprises filters having a controllable frequency response.

9. The device of claim 7, wherein said signal-processing unit has a controllable transmission function.

10. The device of claim 7, wherein said signal-processing unit comprises means for timing recovery.

11. The device of claim 7, wherein said measuring means is adapted to measure electrical parameters of an HF input signal, including at least one of the amplitude, a signal-to-noise ratio, and a spectral composition, and to communicate said electrical parameters to said signal processing unit.

12. The device of claim 7, wherein said measuring means is adapted to measure physical parameters, including at least one of a distance between a transmitter and a receiver, a speed between the transmitter and the receiver, or also a temperature value, and to communicate said physical parameters to said signal processing unit.

13. A device for receiving digital signals, comprising:
   a receiving antenna for receiving signals in a near field of a transmitter conductor array, said signals having analog properties;
   a signal-processing unit for processing signals supplied by the receiving antenna;
   a digitizer for converting processed signals supplied by the signal processing unit to digital signals;
   wherein at least one controller is provided for controlling a coupling between said receiving antenna and said transmitter conductor array;
   wherein a measuring means is provided for determining at least one parameter of relevance to signal quality and is connected to communicate to said at least one controller the determined at least one parameter of relevance to signal quality; and
   wherein said at least one controller controls the coupling between said receiving antenna and said transmitter conductor array according to the determined at least one parameter communicated by said measuring means; and wherein actuators are provided for mechanically positioning said receiving antenna relative to the transmitter conductor array for matching said receiving antenna to said transmitter conductor array.

14. The device of claim 13, wherein said signal-processing unit comprises filters having a controllable frequency response.

15. The device of claim 13, wherein said signal-processing unit has a controllable transmission function.

16. The device of claim 13, wherein said signal-processing unit comprises means for timing recovery.

17. The device of claim 13, wherein said measuring means is adapted to measure electrical parameters of an HF input signal, including at least one of the amplitude, a signal-to-noise ratio, and a spectral composition, and to communicate said electrical parameters to said signal processing unit.

18. The device of claim 13, wherein said measuring means is adapted to measure physical parameters, including at least one of a distance between a transmitter and a receiver, a speed between the transmitter and the receiver, or also a temperature value, and to communicate said physical parameters to said signal processing unit.

* * * * *